3,669,690
PROCESS FOR RECOVERY OF MEAT ESSENCES
Masahide Nonaka, Moraga, Calif., assignor to the United States of America as represented by the Secretary of Agriculture
No Drawing. Filed Jan. 26, 1971, Ser. No. 109,965
Int. Cl. A23l 1/22
U.S. Cl. 99—140 R            10 Claims

ABSTRACT OF THE DISCLOSURE

Process for recovering volatile flavor essences from meat and meat products, using di-n-butyl phthalate as an extraction or entrapment medium.

---

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of novel processes for recovering the volatile flavor essences from meat and meat products, for example, animal flesh, organs, skin, fat, broths, drippings from meat-roasting operations, etc., and including such materials derived from poultry, beef, pork, lamb, veal, and the like. The expression "meat material" is hereinafter used in a generic sense as including both meat and meat products.

Further objects of the invention will be evident from the following description wherein parts and percentages are by weight unless otherwise specified.

It is well known that meats contain small but significant amounts of volatile flavoring materials, or essences as they may be termed. These essences provide characteristic flavors to the meat and are, in large measure, responsible for their appeal to the palate. When meats are processed by conventional techniques such as dehydration and canning, much of the volatile flavor is lost by evaporation and as a consequence the preserved product is flat or lacking in the desired meaty aroma.

One of the objects of the invention is to provide the means for obviating the problem outlined above. The invention enables one to capture these volatile essences in a concentrated form so that they can be used to enhance the flavor of food products deficient in meaty aroma.

In accordance with the invention, the volatile flavor principles of meat materials are recovered by processes of extraction or entrapment using a particular medium, namely, di-n-butyl phthalate (hereinafter designated as DNBP). The essence captured in this way accurately represents the aroma of the particular meat material used as the starting material. DNBP has the unique and desirable property of capturing the meaty essence while at the same time rejecting (not dissolving) undesirable components such as water, carbohydrates, proteins, amino acids, inorganic salts, etc.

An advantage of the invention is that the essence is recovered without applying any excessive or extreme conditions which might destroy or alter its composition. In this way the actual compounds responsible for the flavor and odor properties are those which are recovered.

Another advantage of the invention is that it provides recovered essences which are stable against both alteration of aroma characteristics and development of off-odors.

Another advantage of the invention is that DNBP is a stable, neutral, high-boiling substance. This permits the facile isolation of the low-boiling essences from the DNBP extracts containing the same.

A further advantage is that DNBP is odorless and, therefore, does not contribute any off-flavor to the captured essence. In this respect, the related compound diethyl phthalate cannot be used for the extraction because of its perfume-like odor and higher volatility.

Another advantage of the invention is that water is soluble only to a slight extent in DNBP. As a result, the extracts contain at most a small proportion of water. Moreover, this dissolved water can readily be eliminated by cooling the extract to a temperature below 0° C. to freeze out the water as ice, followed by filtration or centrifugation to remove the ice.

A further advantage to be noted is that DNBP is chemically inert; it does not react with any of the flavor components. Moreover, DNBP does not hydrolyze so that there is no contamination of the essence, and the medium can be recovered from the extracts and used over and over again.

The invention may be practiced in various ways. A preferred technique is to vaporize the essence contained in the meat material and then contact the vapors with DNBP to capture the essence. An example of this procedure is illustrated as follows: A selected meat material is subjected to cooking, for instance, boiled in water, contacted with steam, or dry-heated in a pot, oven, or the like. The resulting vapor is then treated to remove water vapor therefrom, as by passing it through a condenser and through a trap containing a water-absorbing agent such as calcium chloride. The remaining vaporous material is conducted into a pool of DNBP whereby the flavor essence in the vapor is absorbed, thus yielding a solution of the essence in DNBP. The movement of vapor through the system is preferably enhanced by sweeping with a current of a carrier gas such as air, or more preferably, a non-oxidizing gas such as nitrogen, helium, carbon dioxide, or the like.

The product of this procedure—the DNBP containing entrapped essence—is then treated to isolate the essence. In the event that the product contains water, it is preferred to first de-water it by cooling to below 0° C., then filtering out the so-formed ice. The liquid is next subjected to distillation, preferably under vacuum, to isolate the essence. Due to the low boiling point of the essence in contrast to the high boiling point of DNBP, the separation can be carried out easily and effectively.

In an alternative modification of the invention, the DNBP is mixed with the meat material, typically, cooked animal flesh, meat broth, drippings from meat roasting, or the like. The mixture may be at room temperature (25° C.), but is more preferably heated to about 50–100° C. The resulting extract—the solution of the essence in DNBP—is then mechanically separated from the meat material by applying screening, decanting, centrifuging, filtering, or the like. The separated extract is then subjected to distillation, preferably under reduced pressure, to isolate the essence from residual DNBP. Preferably, the extract is de-watered as previously described prior to application of the distillation step.

The essences recovered in accordance with the invention can be used directly for flavor-fortifying foods of all kinds. Usually, however, it is preferred to incorporate them with a diluent to increase their bulk so that small amounts of the essences may be accurately metered into a given food product. As the diluent, one may use liquid or solid carriers such as mineral oil (liquid petrolatum), glycerol, edible fats, or oils, starch, sorbitol, salt, sugar, gelatin, flour, corn syrup solids or other non-toxic substance compatible with the material to be flavored.

The compositions of the invention—that is, the essences as such or in diluted form—can be used to flavor meat dishes of all kinds, including canned meats, sausages, meat loaves, potted meats, soups, gravies, stews, etc. In addition, they can be used to provide a meaty aroma to non-meat items such as cheeses, dips, crackers, pizza, ravioli and other alimentary pastes, sauces, etc.

The invention is further demonstrated by the following illustrative examples.

EXAMPLE 1

Entrapment of chicken broth aroma

An apparatus was set up, including a 5-liter Pyrex flask equipped with an inlet for nitrogen gas and a water-cooled reflux condenser. The upper end of the condenser was connected by glass tubing with a calcium chloride trap and then to a trap containing 20 ml. of DNBP which had previously been purged with nitrogen gas to remove any volatile impurities.

Chicken meat (1.4 kg.) and an equal weight of water were introduced into the flask and cooked (100° C.) under reflux for 7 hours. The vapors arising from the cooking meat were swept by a current of nitrogen (inlet flow, 60 ml./min.) through the condenser, then through the $CaCl_2$ trap (for absorption of water), then through the 20-ml. pool of DNBP maintained at room temperature.

At the end of the run, the DNBP-essence solution was removed from the trap, and labelled CO. This product was found to exhibit an intense odor of cooked chicken. To estimate the strength of the product, it was diluted with successive quantities of DNBP and after each dilution a portion of the liquid was absorbed on a perfume-testing blotter and judged for aroma by smelling. It was found that the aroma was still detectable when one volume of the solution (CO) had been diluted with 10,000 volumes of DNBP.

An 8-ml. aliquot of solution CO was distilled under vacuum in a short-path still. The distillate was collected at 60° C. and 100 to 200 microns, and subsequently dissolved in 2 ml. of mineral oil. Then, 0.1 ml. of this solution was added to 10 ml. of freshly-prepared chicken broth. It was noted that the treated broth had a considerably enhanced meaty flavor as compared to a sample of untreated broth.

EXAMPLE 2

Application to pork, beef, and lamb

The process of Example I was repeated several times, using other meats in place of chicken, namely, pork, beef, and lamb. In each case there was obtained a DNBP-essence solution which exhibited an intense odor of the cooked meat it was derived from. Intensity tests showed that each of these solutions could be diluted with 10,000 volumes of DNBP before the meat aroma became undetectable.

EXAMPLE 3

Extraction of aroma from chicken broth

To approximately 1.4 liters of fat-free, filtered chicken broth was added 20 ml. of DNBP. This mixture was heated on a steam bath (about 100° C.) for 2 hours. The DNBP extract was decanted from the broth and filtered. To remove its small content of water, the extract was chilled to 10° F. and filtered to remove the ice which formed. The product was found to exhibit an intense aroma of cooked chicken. A portion of the extract was subjected to distillation under vacuum as described in Examle 1 to isolate the essence.

EXAMPLE 4

Extraction of turkey aroma from pan drippings

To 500 ml. of roast turkey drippings from which the fat had been decanted was added 1.5 liters of water. The diluted drippings were then filtered successively through cheesecloth and paper to further remove fat and solid material. DNBP (20 ml.) was added to the clear drippings and the mixture heated on the steam bath for several hours. The DNBP extract was decanted from the mixture and filtered and de-watered as described in Example 3. The product was found to exhibit an intense odor of roast turkey. A portion of the extract was subjected to distillation under vacuum as described in Example 1 to isolate the turkey essence.

EXAMPLE 5

Extraction of aroma from roasting chicken

A 1.4 kg. dressed chicken was placed in a closed cooking vessel equipped with a gas inlet and outlet. The outlet was connected to a distillate receiver which in turn was connected to a reflux condenser and a trap containing 20 ml. of DNBP. The vessel was placed in an oven held at 150° C. While the meat was roasting, the evolved vapors were swept through the system with a current of air (inlet flow of approximately 10 ml./min.). When the internal temperature of the vessel reached 100° C., the cooking was stopped.

The DNBP-essence solution was removed from the trap; it was found to exhibit an intense aroma of roast chicken. A portion of the solution was de-watered as described in Example 3, then subjected to distillation under vacuum as described in Example 1 to isolate the essence.

Having thus described my invention, I claim:

1. A process for recovering the volatile flavor and aroma constituents from a meat material which comprises capturing the same in di-n-butyl phthalate.

2. A process for recovering the volatile flavor essence from a meat material, which comprises
   (a) cooking the said material whereby to form a vapor containing the volatile flavor principles of the material, and
   (b) directing the said vapor into di-n-butyl phthalate whereby to capture the volatile flavor principles therein.

3. The process of claim 2 wherein the di-n-butyl phthalate containing the captured volatile flavor principles is subjected to distillation under reduced pressure to isolate the flavor principles.

4. The process of claim 2 wherein the di-n-butyl phthalate containing the captured flavor principles is de-watered by cooling to below 0° C. and the so-formed ice separated therefrom.

5. The process of claim 2 wherein a carrier gas is used to sweep the vapor into the di-n-butyl phthalate.

6. The process of claim 2 wherein the cooking is in water at about 100° C.

7. The process of claim 2 wherein the cooking is by application of dry heat at about 100–150° C.

8. A process for recovering the volatile flavor essence from a meat material which comprises
   (a) mixing the material with di-n-butyl phthalate, and
   (b) separating the extract containing the essence dissolved in di-n-butyl phthalate.

9. The process of claim 8 wherein the extract is subjected to distillation under reduced pressure to isolate the flavor essence.

10. The process of claim 8 wherein the extract is de-watered by cooling to below 0° C. and the so-formed ice separated therefrom.

References Cited

UNITED STATES PATENTS 3,113,031  12/1963  Stanley et al. _____ 99—140

MORRIS O. WOLK, Primary Examiner

W. BOVEE, Assistant Examiner

U.S. Cl. X.R.

99—110